US011613998B2

(12) United States Patent
Kupratis et al.

(10) Patent No.: US 11,613,998 B2
(45) Date of Patent: Mar. 28, 2023

(54) INTEGRATED ELECTRO-AERO-THERMAL TURBINE ENGINE

(71) Applicant: RAYTHEON TECHNOLOGIES CORPORATION, Farmington, CT (US)

(72) Inventors: Daniel Bernard Kupratis, Wallingford, CT (US); Zubair Ahmed Baig, South Windsor, CT (US); Gary Collopy, Vernon, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/465,251

(22) Filed: Sep. 2, 2021

(65) Prior Publication Data

US 2022/0136401 A1     May 5, 2022

Related U.S. Application Data

(63) Continuation of application No. 16/900,168, filed on Jun. 12, 2020, now Pat. No. 11,136,899.

(Continued)

(51) Int. Cl.
*F01D 15/10* (2006.01)
*F01D 25/24* (2006.01)
(Continued)

(52) U.S. Cl.
CPC ............ *F01D 15/10* (2013.01); *F01D 25/24* (2013.01); *F02C 7/32* (2013.01); *F02C 7/36* (2013.01);
(Continued)

(58) Field of Classification Search
CPC ... F01D 15/10; F01D 25/24; B64D 2027/026; F05D 2220/50; F05D 2220/76; F02C 7/32; F02C 7/36; F02K 3/06
See application file for complete search history.

(56) References Cited

U.S. PATENT DOCUMENTS

| 6,082,967 A | 7/2000 | Loisy |
| 6,895,741 B2 | 5/2005 | Rago et al. |

(Continued)

FOREIGN PATENT DOCUMENTS

| EP | 3633165 A1 | 4/2020 |
| EP | 3751111 A1 | 12/2020 |

(Continued)

OTHER PUBLICATIONS

English Translation FR-2994707-A1 (Year: 2012).*

(Continued)

*Primary Examiner* — Shafiq Mian
(74) *Attorney, Agent, or Firm* — Carlson, Gaskey & Olds, P.C.

(57) ABSTRACT

A turbine engine includes integrated electric machines in the compressor section and the turbine section to supplement power produced from fuel with electric power. The example compressor section includes a compressor electric motor that is coupled to a compressor generator. The example turbine section includes a turbine electric motor that is coupled to the geared architecture to supplement power driving the fan section. A turbine generator provides electric power to the turbine electric motor.

16 Claims, 8 Drawing Sheets

Related U.S. Application Data

(60) Provisional application No. 62/861,678, filed on Jun. 14, 2019, provisional application No. 62/861,749, filed on Jun. 14, 2019, provisional application No. 62/861,727, filed on Jun. 14, 2019.

(51) Int. Cl.
  *F02C 7/32* (2006.01)
  *F02C 7/36* (2006.01)
  *F02K 3/06* (2006.01)
  *B64D 27/02* (2006.01)

(52) U.S. Cl.
  CPC .......... *F02K 3/06* (2013.01); *B64D 2027/026* (2013.01); *F05D 2220/50* (2013.01); *F05D 2220/76* (2013.01)

(56) References Cited

U.S. PATENT DOCUMENTS

| | | | |
|---|---|---|---|
| 7,363,757 B2 | 4/2008 | Loisy | |
| 8,191,352 B2 | 6/2012 | Schilling | |
| 8,231,341 B2 | 7/2012 | Anderson et al. | |
| 9,822,703 B2 | 11/2017 | Yu et al. | |
| 9,938,850 B2 | 4/2018 | Edwards et al. | |
| 10,060,357 B2 | 8/2018 | Adams et al. | |
| 10,240,477 B2 | 3/2019 | Ettridge et al. | |
| 11,230,385 B2* | 1/2022 | Adibhatla | B64D 27/10 |
| 2004/0255590 A1 | 12/2004 | Rago et al. | |
| 2006/0272313 A1 | 12/2006 | Eick et al. | |
| 2010/0126178 A1 | 5/2010 | Hyde et al. | |
| 2013/0164115 A1 | 6/2013 | Sennoun | |
| 2015/0247455 A1* | 9/2015 | Sheridan | B64D 27/12 60/805 |
| 2015/0267788 A1 | 9/2015 | Ishihara | |
| 2015/0274306 A1 | 10/2015 | Sheridan | |
| 2016/0160867 A1 | 6/2016 | Gehlot | |
| 2016/0229549 A1 | 8/2016 | Mitrovic et al. | |
| 2017/0082033 A1 | 3/2017 | Wu et al. | |
| 2017/0349293 A1 | 12/2017 | Klemen et al. | |
| 2018/0003071 A1 | 1/2018 | Lents et al. | |
| 2019/0085725 A1* | 3/2019 | Zatorski | F02C 7/06 |
| 2019/0128181 A1 | 5/2019 | Smith | |
| 2019/0145322 A1 | 5/2019 | Sellick et al. | |
| 2019/0368424 A1 | 12/2019 | Kupratis et al. | |
| 2020/0003115 A1 | 1/2020 | Jones et al. | |
| 2020/0109685 A1* | 4/2020 | Kupratis | F02K 3/06 |
| 2020/0263550 A1* | 8/2020 | Stuart | F01D 1/20 |

FOREIGN PATENT DOCUMENTS

| | | | |
|---|---|---|---|
| FR | 2994707 A1 * | 2/2014 | B60L 11/04 |
| RO | 133355 | 5/2019 | |
| WO | 2017036657 A1 | 3/2017 | |
| WO | 2018203941 A2 | 11/2018 | |

OTHER PUBLICATIONS

European Search Report for European Application No. 20180046.3 dated Dec. 1, 2020.

European Search Report for European Application No. 20180038.0 dated Nov. 10, 2020.

European Search Report for European Application No. 19201732.5 dated Feb. 26, 2020.

Search Report for Application No. GB2014189.1 dated Mar. 3, 2021.

* cited by examiner

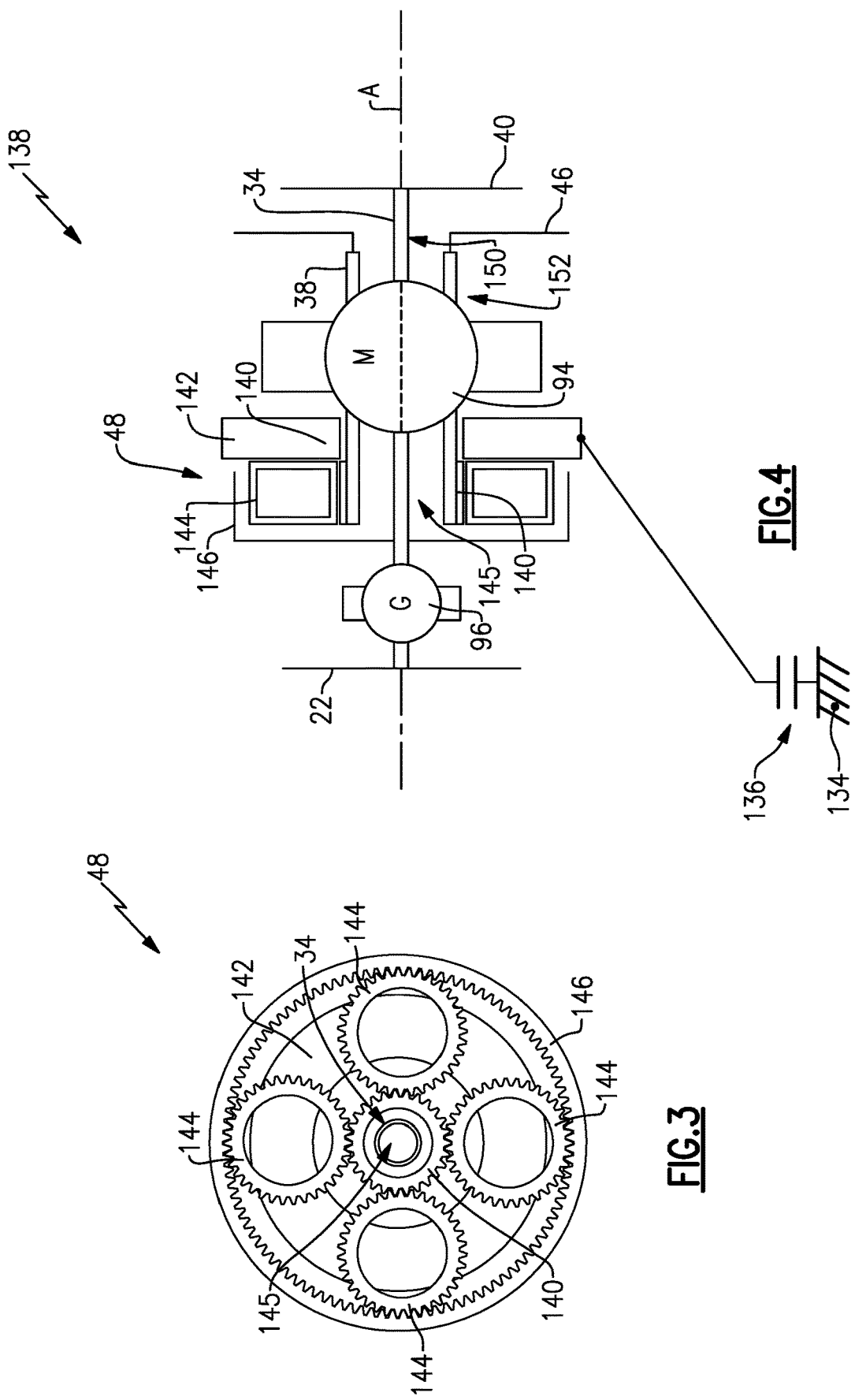

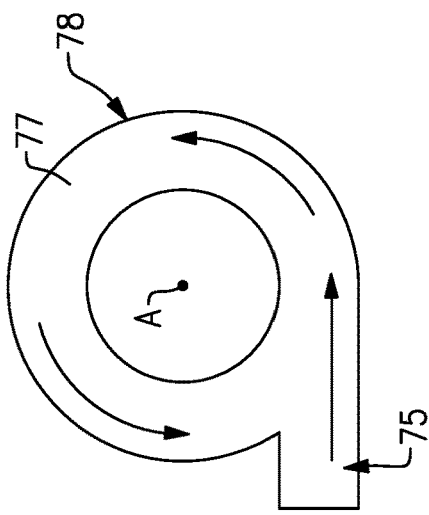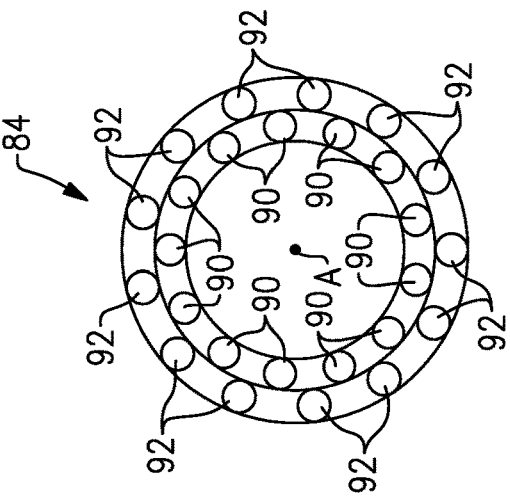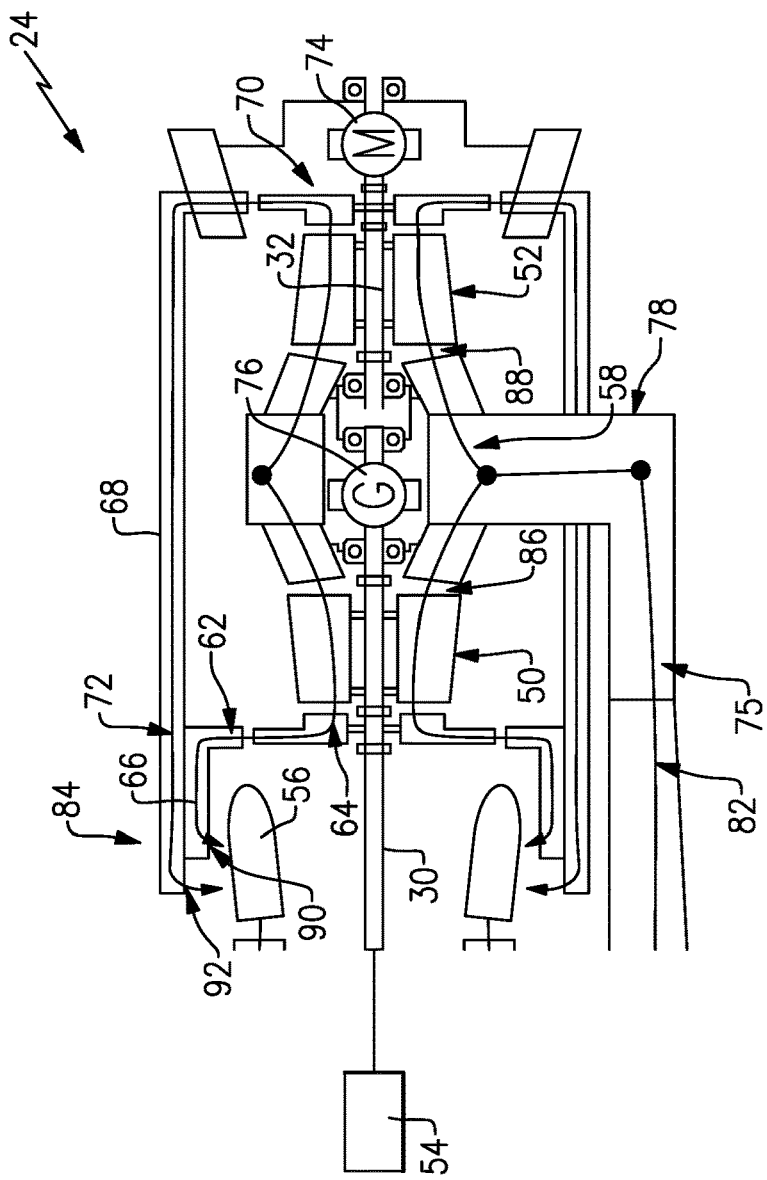

INTEGRATED ELECTRO-AERO-THERMAL TURBINE ENGINE

REFERENCE TO RELATED APPLICATION

This application is a Continuation of U.S. application Ser. No. 16/900,168 filed on Jun. 12, 2020 which claims priority to U.S. Provisional Application Ser. Nos. 62/861,678; 62/861,727 and 62/861,749 all filed on Jun. 14, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Electric generators and motors have been incorporated into engines to produce electric energy for various engine and aircraft support systems. However, primary power production and operation relies on conversion of the high-energy exhaust gas flow into mechanical power. Integration of electric motors into operation of turbine engines is of increasing interest to improve engine efficiencies.

Turbine engine manufacturers continually seek improvements to engine performance including improvements to thermal, transfer and propulsive efficiencies.

SUMMARY

A turbine engine according to an exemplary embodiment of this disclosure, among other possible things includes a fan section that is rotatable about an engine longitudinal axis, a fan drive system that is configured to drive the fan section, the fan drive system includes a turbine section, a turbine generator is electrically coupled to a turbine motor and a geared architecture. The turbine section and the turbine motor are coupled to drive portions of the geared architecture. The turbine engine further includes a high pressure turbine that is coupled to drive a compressor generator, a high pressure compressor section that includes a first compressor section and a second compressor section. The first compressor section is driven by the high pressure turbine and the second compressor section is driven by a compressor motor that is electrically coupled to the compressor generator. The turbine engine further includes a combustor that is in flow communication with the high pressure compressor. The turbine engine also includes a battery system that is electrically coupled to each of the turbine motor and the compressor motor to supplement power that is provided by a corresponding one of the turbine generator and the compressor generator.

In a further embodiment of the foregoing, the turbine engine includes a diffuser that is configured to communicate airflow from the first compressor section and the second compressor section separately to a combustor.

In a further embodiment of any of the foregoing, the diffuser comprises a plurality of first conduits that extend from the first compressor section to the combustor and a plurality of second conduits that extend from the second compressor section to the combustor. The plurality of first conduits and the plurality of second conduits alternate circumferentially about the combustor section.

In a further embodiment of any of the foregoing, the high pressure compressor section is disposed aft of the combustor and the turbine section is disposed forward of the combustor.

In a further embodiment of any of the foregoing, the turbine engine includes an exhaust manifold that directs exhaust gas flow exiting the turbine section of the fan drive system aft.

In a further embodiment of any of the foregoing, the turbine engine includes a low pressure compressor forward of the turbine section.

In a further embodiment of any of the foregoing, the turbine engine includes an intake scroll that defines a passage for airflow exiting the low pressure compressor to the high pressure compressor around the turbine section.

In a further embodiment of any of the foregoing, the turbine section of the fan drive system includes an intermediate turbine that is coupled to drive the turbine generator and a first portion of the geared architecture and a low pressure turbine that is coupled to the electric motor and a second portion of the geared architecture.

In a further embodiment of any of the foregoing, the geared architecture includes a sun gear that is intermeshed with intermediate gears supported in a carrier and ring gear that circumscribes the intermediate gears. The low pressure turbine is coupled to the sun gear and the intermediate turbine is coupled to the ring gear.

In a further embodiment of any of the foregoing, a shaft couples the intermediate pressure turbine to the turbine generator that extends through a central opening in the sun gear.

In a further embodiment of any of the foregoing, the turbine engine includes a turbine drive control that matches operation of the turbine generator to output requirements of the turbine motor.

In a further embodiment of any of the foregoing, the turbine engine includes a compressor drive control that matches operation of the compressor generator to output requirements of the compressor motor to match operation of the second compressor section with operation of the first compressor section.

In a further embodiment of any of the foregoing, the first compressor section and the second compressor section generate a total output airflow that is communicated to the combustor section. The total output airflow includes a first output airflow from the first compressor section and a second output airflow from the second compressor section and the first output airflow and the second output airflow are equal at the combustor.

In a further embodiment of any of the foregoing, the first compressor section and the second compressor section generate a total output airflow that is communicated to the combustor section. The total output airflow includes a first output airflow from the first compressor section and a second output airflow from the second compressor section wherein the first output airflow is different than the second output airflow at the combustor.

A method of operating a turbine engine according to an exemplary embodiment of this disclosure, among other possible things includes coupling a high pressure turbine to a compressor generator, coupling a first compressor section to the high pressure turbine and coupling a second section compressor section to a compressor motor electrically coupled to the compressor generator. The method also includes generating a high pressure airflow from the first compressor section separate from a high pressure flow generated by the second compressor section, configuring a combustor to receive the high pressure flow from each of the first compressor section and the second compressor section independent of each other, coupling a fan to a fan drive system that includes a turbine section, a turbine generator that is electrically coupled to a turbine motor and a geared architecture. The turbine section and the turbine motor are coupled to drive portions of the geared architecture. The method further includes supplementing power that is transferred through the geared architecture with the turbine motor, and selectively electrically coupling a battery system to each of the turbine motor and the compressor motor to supplement electric power that is provided by a corresponding one of the turbine generator and the compressor generator.

In a further embodiment of the foregoing, the method includes generating the high pressure flow from the first compressor section and the second compressor section that includes matching operation of the second compressor section to the operation of the first compressor section by controlling the compressor motor to drive the second compressor section to generate the high pressure airflow that provides a pressure and volume that combined with high pressure air flow from the first compressor section provides a total output airflow to the combustor section.

In a further embodiment of the foregoing, the method includes adjusting operation of the turbine motor to maintain an operating condition of the fan while reducing power generated from the turbine section.

In a further embodiment of the foregoing, the turbine section of the fan drive system includes an intermediate pressure turbine that is coupled to drive the turbine generator and a low pressure turbine that is coupled to both the turbine motor and a sun gear of the geared architecture and supplementing power input into the geared architecture includes driving the turbine motor to reduce a load on the low pressure turbine.

In a further embodiment of the foregoing, the method includes matching operation of the turbine generator with operation of the turbine motor.

In a further embodiment of the foregoing, the method includes reducing power required by the high pressure turbine, the intermediate pressure turbine and the low pressure turbine by increasing power that is provided by one of the turbine motor and the compressor motor.

In another example disclosed embodiment, a compressor section includes a first compressor section coupled to a turbine section, a first conduit between the first compressor section and a combustor section configured to communicate a first airflow portion to the combustor section, a second compressor section coupled to an electric motor, and a second conduit between the second compressor section and the combustor section for communicating a second airflow portion to the combustor section.

The example compressor section embodiment may further include an inlet scroll communicating airflow concurrently into both the first compressor section and the second compressor section.

In any of the foregoing example compressor section embodiments, the first conduit comprises a plurality of first conduits, the second conduit comprises a plurality of second conduits, and the plurality of first conduits and the plurality of second conduits alternate circumferentially about a combustor.

In any of the foregoing example compressor section embodiments, the first compressor section and the second compressor section generate a total output airflow communicated to the combustor section, wherein the total output airflow comprises a first output airflow from the first compressor section and a second output airflow from the second compressor section and the first output airflow and the second output airflow are equal at the combustor.

In any of the foregoing example compressor section embodiments, the first compressor section and the second compressor section generate a total output airflow communicated to the combustor section, wherein the total output airflow comprises a first output airflow from the first compressor section and a second output airflow from the second compressor section wherein the first output airflow is different than the second output airflow at the combustor.

In any of the foregoing example compressor section embodiments, an electric generator is driven by a turbine section, wherein the electric motor driving the second compressor section is electrically coupled to the electric generator.

In any of the foregoing example compressor section embodiments, a drive control controls operation of the electric motor and the electric generator to match operation of the second compressor section with operation of the first compressor section.

In any of the foregoing example compressor section embodiments, the matched operation of the second compressor section includes operation of the electric motor to drive the second compressor section to generate a second output airflow equal in pressure and volume to a first output airflow equal from the first compressor section.

In any of the foregoing example compressor section embodiments, the matched operation of the second compressor section includes operation of the electric motor to drive the second compressor section to generate a second output airflow that provides a pressure and volume that combined with a first output airflow from the first compressor section provides a total output airflow to the combustor section.

In any of the foregoing example compressor section embodiments, a battery system electrically coupled to the electric motor for powering operation of the electric motor.

Another disclosed example turbine engine embodiment includes a turbine section, a combustor section, a high pressure compressor including a first compressor section driven by the turbine section and a second compressor section, a generator coupled to the turbine section, the turbine section driving the generator to produce electric power during engine operation, an electric motor coupled to the second compressor section, wherein the electric motor is electrically coupled to the generator, a first conduit between the first compressor section and the combustor section for communicating a first airflow portion to the combustor section, and a second conduit between second compressor section and the combustor section for communicating a second airflow portion to the combustor section.

In any of the foregoing disclosed turbine engine embodiments, an inlet scroll communicating airflow concurrently into both the first compressor section and the second compressor section.

In any of the foregoing disclosed turbine engine embodiments, the first conduit comprises a plurality of first conduits, the second conduit comprises a plurality of second conduits, and the plurality of first conduits and the plurality of second conduits extend axially from the high pressure compressor section and alternate circumferentially about the combustor section.

In any of the foregoing disclosed turbine engine embodiments, a drive control that controls operation of the electric motor and the generator to match operation of the second compressor section with operation of the first compressor section.

In any of the foregoing disclosed turbine engine embodiments, a battery system is electrically coupled to the electric motor for supplementing power to operate the electric motor.

A method of operating a compression section of a turbine engine according to another example embodiment includes coupling a first compressor section and an electric generator to a turbine section of the turbine engine, coupling a second compressor section to an electric motor, electrically powering the electric motor with power generated by the electric generator, communicating inlet airflow concurrently to both the first compressor section and the second compressor section, compressing the inlet airflow separately with both the first compressor section and the second compressor section, and communicating compressed inlet airflow separately from both the first compressor section and the second compressor section to a combustor section.

Another embodiment of the foregoing method, includes generating a total output airflow communicated to the combustor section, wherein the total output airflow comprises a first output airflow from the first compressor section and a second output airflow from the second compressor section such that the first output airflow and the second output airflow are equal.

Another embodiment of any of the foregoing methods includes generating a total output airflow communicated to the combustor section, wherein the total output airflow comprises a first output airflow from the first compressor section and a second output airflow from the second compressor section such that the first output airflow is different than the second output airflow at the combustor section.

Another embodiment of any of the foregoing methods includes controlling operation of the electric motor with a drive control to match operation of the second compressor section with operation of the first compressor section.

Another embodiment of any of the foregoing methods wherein the matched operation of the second compressor section includes operation of the electric motor to drive the second compressor section to generate a second output airflow that provides a pressure and volume that combined with a first output airflow from the first compressor section provides a total output airflow to the combustor section.

A fan drive system for a turbine engine according to another disclosed example embodiment includes a turbine section, a turbine generator coupled to be driven by the turbine section, a turbine motor electrically coupled to the turbine generator, and a geared architecture coupled to the turbine section and the turbine motor. The geared architecture including an output coupled to drive a fan.

In another embodiment of the foregoing fan drive system, the turbine section of the fan drive system includes an intermediate turbine coupled to the turbine generator and a first portion of the geared architecture and a low pressure turbine coupled to the turbine motor and a second portion of the geared architecture.

In another embodiment of any of the foregoing fan drive system, the geared architecture includes a sun gear intermeshed with intermediate gears supported in a carrier and a ring gear circumscribing the intermediate gears, wherein the low pressure turbine is coupled to the sun gear and the intermediate turbine is coupled to the ring gear.

In another embodiment of any of the foregoing fan drive system, an intermediate shaft couples the intermediate pressure turbine to the turbine generator that extends through a central opening in the sun gear.

In another embodiment of any of the foregoing fan drive system, a low shaft couples the low pressure turbine to the motor and the sun gear.

In another embodiment of any of the foregoing fan drive system, the carrier is selectively coupled to an engine static structure with a clutch.

In another embodiment of any of the foregoing fan drive system, the low pressure turbine is axially forward of the intermediate pressure turbine relative to the geared architecture.

In another embodiment of any of the foregoing fan drive system, a turbine drive control that matches operation of the turbine generator to output requirements of the turbine motor.

In another embodiment of any of the foregoing fan drive system, a battery system electrically coupled to the turbine motor to supplement power provided by the turbine generator.

A turbine engine according to another disclosed example embodiment includes a fan rotatable about an engine longitudinal axis, a fan drive system including a turbine section, a turbine generator coupled to be driven by the turbine section, a turbine motor electrically coupled to the turbine generator, and a geared architecture coupled to the turbine section and the turbine motor, the geared architecture including an output coupled to drive a fan, a combustor in flow communication with the turbine section, a compressor section configured to generate a high pressure airflow communicated to the combustor, and a turbine drive control that matches operation of the turbine generator to output requirements of the turbine motor.

In another embodiment of the foregoing turbine engine, the turbine section of the fan drive system includes an intermediate turbine coupled to the turbine generator and a first portion of the geared architecture and a low pressure turbine coupled to the turbine motor and a second portion of the geared architecture.

In another embodiment of any of the foregoing turbine engines, the geared architecture includes a sun gear intermeshed with intermediate gears supported in a carrier and a ring gear circumscribing the intermediate gears, wherein the low pressure turbine is coupled to the sun gear and the intermediate turbine is coupled to the ring gear.

In another embodiment of any of the foregoing turbine engines, an intermediate shaft couples the intermediate pressure turbine to the turbine generator that extends through a central opening in the sun gear and a low shaft coupling the low pressure turbine to the motor and the sun gear.

In another embodiment of any of the foregoing turbine engines, the compressor section includes a high pressure turbine coupled to drive a high pressure compressor section including a first compressor section and a second compressor section, the first compressor section driven by a high pressure turbine and the second compressor section driven by a compressor motor electrically coupled to the compressor generator.

In another embodiment of any of the foregoing turbine engines, a low pressure compressor tied to the fan.

In another embodiment of any of the foregoing turbine engines, an exhaust manifold configured to direct exhaust gas flow exiting the turbine section of the fan drive system aft.

A method of operating a turbine engine according to another example embodiment includes coupling a fan to a fan drive system where the fan drive system includes a turbine section, a turbine generator electrically coupled to a turbine motor and a geared architecture and the turbine section and the turbine motor are coupled to drive portions of the geared architecture. The method further includes supplementing power transferred through the geared architecture with the turbine motor, and selectively electrically coupling a battery system to a turbine motor to supplement electric power provided by the turbine generator.

Another embodiment of the foregoing method of operating a turbine engine, includes adjusting operation of the turbine motor to maintain an operating condition of the fan while reducing power generated from the turbine section.

In another embodiment of any of the foregoing methods of operating a turbine engine, the turbine section of the fan drive system includes an intermediate pressure turbine that is coupled to drive the turbine generator and a low pressure turbine that is coupled to both the turbine motor and a sun gear of the geared architecture and supplementing power input into the geared architecture includes driving the turbine motor to reduce a load on the low pressure turbine Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic view of an example geared architecture embodiment.

FIG. 4 is a schematic view of an example fan drive system embodiment.

FIG. 5 is a schematic view of an example compressor section of a gas turbine engine.

FIG. 6 is a schematic cross-section of an inlet scroll for the example compressor section.

FIG. 7 is a cross-section schematic view of a diffuser communicating airflow to a combustor section.

DETAILED DESCRIPTION

Disclosed gas turbine engines integrate electric generators and motors into a hybrid electro-aero-thermal turbine engine. In the example turbine engines, fuel and electricity are converted to mechanical power to increase kinetic energy of flows through the engine. Conversion of fuel to mechanical power is accomplished by combining the fuel with high pressure air and igniting the mixture to produce a high energy gas flow. The high energy gas flow is converted to mechanical energy as it expands through the turbine section. An electro-chemical potential of energy stored in a battery is converted to mechanical power by electric motors to increase kinetic energy of engine flows. Conversion of fuel to mechanical power is not as efficient as the conversion of electro-chemical potential to mechanical power. The disclosed example engines integrate fuel and electro-chemical power to improve overall engine efficiencies.

Figure 1:
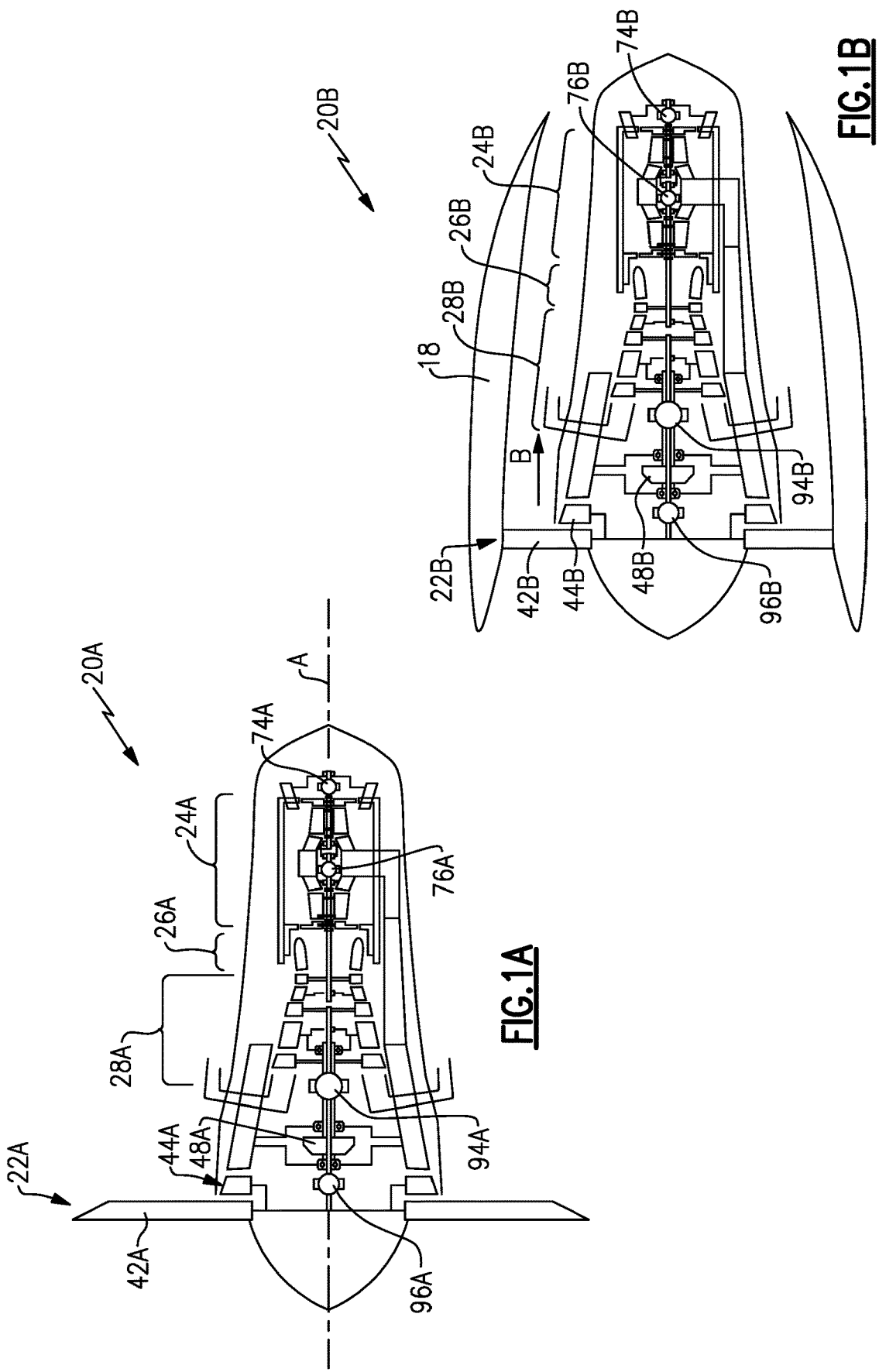
FIG. 1A is a schematic view of an example turboprop turbine engine embodiment.
FIG. 1B is a schematic view of a ducted fan gas turbine engine embodiment.

Referring to FIGS. 1A and 1B, disclosed integrated engine architectures are schematically indicated at 20A and 20B. The engine 20A is a turboprop engine with an open fan rotor architecture that operates a fan section 22A outside of any enclosure. The engine 20B is a ducted fan architecture with a fan section 22B directing airflow through a bypass flow path B defined through a nacelle 18. Each of the engines 20A, 20B include common elements described utilizing common reference numerals differentiated by a letter corresponding with a letter in the corresponding FIGS. 1A and 1B.

Both engines 20A, 20B include a fan section 22A, 22B with a corresponding plurality of fan blades 42A, 42B. A compressor section 24A, 24B compresses air that is then directed to a combustor section 26A, 26B. In the combustor section 26A, 26B, fuel is mixed with the compressed air and ignited to generate a high energy exhaust gas flow that expands through a turbine section 28A, 28B. The turbine section 28A, 28B is coupled to drive the compressor section 24A, 24B and the fan section 22A, 22B. In the disclosed engine embodiments, a geared architecture 48A, 48B is driven by a portion of the turbine section 28A, 28B provides for rotation of both the fan section 22A, 22B and turbine section 28A, 28B at closer to optimal speeds.

The engines 20A, 20B include integrated electric machines in the compressor section 24A, 24B and the turbine section 28A, 28B to supplement power produced from fuel with electric power. The example compressor section 24A, 24B includes a compressor electric motor 74A, 74B that is coupled to a compressor generator 76A, 76B. The example turbine section 28A, 28B includes a turbine electric motor 94A, 94B that is coupled to the geared architecture 48A, 48B to supplement power driving the fan section 22A, 22B. A turbine generator 96A, 96B provides electric power to the turbine electric motor 94A, 94B.

Figure 2:
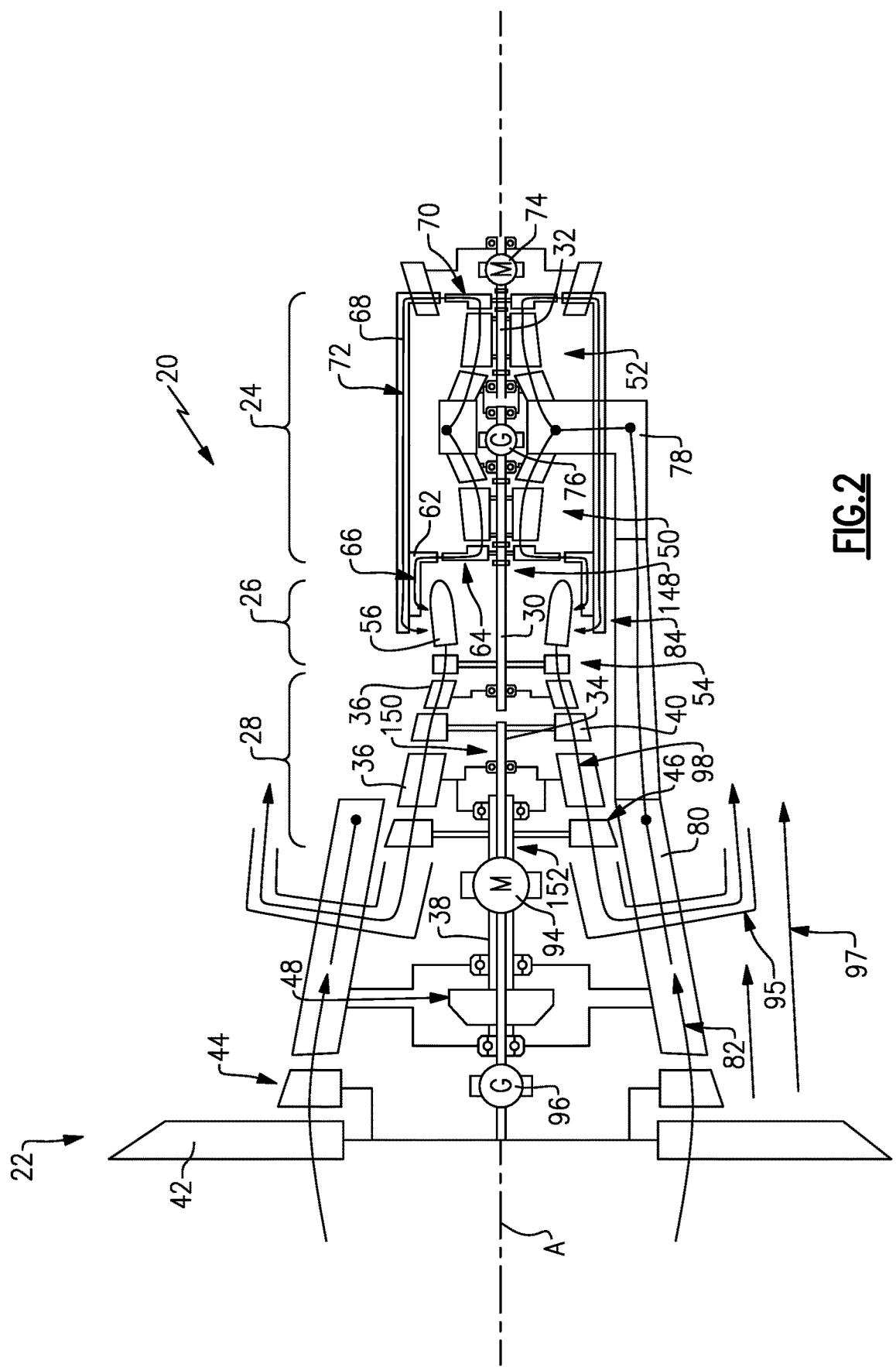
FIG. 2 is a schematic view of an example gas turbine engine embodiment.

FIG. 2 is an engine example that corresponds with each of the engines 20A, 20B and includes reference numerals that refer to like features shown in FIGS. 1A and 1B, but without the alphabet designation to indicate application in either of the disclosed engines 20A, 20B.

The example engine 20 illustrated in FIG. 2, includes integrated electric drive systems augmenting operation of turbine and compressor sections. The example gas turbine engine 20 includes the fan section 22, the turbine section 28, the combustor section 26 and the compressor section 24 disposed serially along an engine longitudinal axis A. The propulsor section 22 includes a plurality of fan blades 42 rotatable about the axis A. The compressor section 24 supplies compressed air to the combustor section 26. Fuel is combined with compressed air from the compressor section 24 and ignited in the combustor section 26 to generate a high energy exhaust gas flow 98. The high energy exhaust gas flow 98 expands through the turbine section 28 to generate rotation of the turbine section 28. The geared architecture 48 is coupled between the turbine section 28 and the propulsor section 22 to provide rotation at different speeds. A low pressure compressor section 44 is disposed axially forward of the turbine section 28 and is coupled to the fan section 22. The low pressure compressor section 44 and the plurality of fan blades 42 rotate at a common speed.

Inlet airflow 82 flows axially through the plurality of fan blades 42 and the low pressure compressor 44 and into an intake passage 80. The intake passage communicates inlet airflow 82 axially aft of the turbine section 28, around the combustor section 26 and to the compressor section 24. In this disclosed example, the inlet airflow 82 is initially compressed by the low pressure compressor 44 and communicated into the intake passages 80. The intake passage 80 communicates airflow directly to the example the compressor section 24 disposed axially aft of the turbine section 28 along the axis A.

The disclosed turbine section 28 includes a high pressure turbine 54, an intermediate pressure turbine 40 and a low pressure turbine 46. The turbines 54, 40 and 46 are serially arranged from the combustor section 26 forward toward the fan section 22. The high energy exhaust gas flow 98 is directed axially forward through the turbine sections 54, 40 and 46 and finally exhausted through an exhaust manifold 95 into a bypass airflow 97. In this example, the exhaust manifold 95 reverses the flow of the high energy exhaust gas flow 98 to combine with a bypass flow 97 generated by the fan section 22.

The disclosed example engine is arranged to include a first spool 148 that includes the high pressure turbine 54, a first high pressure compressor section 50 and the compressor generator 76. A second spool 150 includes the intermediate turbine 40 that is coupled to the fan section 22, turbine generator 96 and a portion of the geared architecture 48. A third spool 152 includes the low pressure turbine 46 that is coupled to the turbine motor 94 and another portion of the geared architecture 48.

Accordingly, the intermediate pressure turbine 40 and the low pressure turbine 46 are both coupled to the geared architecture 48 that drives the fan section 22 at a speed different than either of the low pressure turbine 46 and the intermediate pressure turbine 40. In this example, the intermediate pressure turbine 40 is coupled to both the geared architecture 48 and a turbine generator 96. Electric power produced by the turbine generator 96 powers a turbine motor 94. The turbine motor 94 is coupled through the geared architecture 48 to supplement power to drive the fan section 22.

Referring to FIGS. 3 and 4, with continued reference to FIG. 2, the geared architecture 48, the intermediate pressure turbine 40, the low pressure turbine 46, the turbine motor 94 and the turbine generator 96 define portions of a fan drive gear system 138. The disclosed geared architecture 48 is an epicyclic gear system with a sun gear 140 intermeshed with intermediate gears 144. The intermediate gears 144 are supported by a carrier 142. A ring gear 146 is engaged to the intermediate gears 144.

The intermediate pressure turbine 40 is coupled to the shaft 34 that is coupled to the turbine generator 96. The shaft 34 extends through a hollow interior 145 of the sun gear 140. The shaft 34 is not coupled to the sun gear 140 in this example embodiment. The shaft 34 is coupled to the ring gear 146 and to the fan section 22. The low pressure turbine 46 is coupled to the turbine motor 94 by way of shaft 38. The shaft 38 extends through the turbine motor 94 and drives the sun gear 140. The carrier 142 is not coupled to either the low pressure turbine 46 or the intermediate pressure turbine 40. The carrier 142 may be grounded to an engine static structure 134 through a selectively actuated clutch 136. It should be appreciated that other portions of the geared architecture 48 may be selectively grounded to the engine static structure 134 and are within the contemplation of this disclosure.

The intermediate pressure turbine 40 is coupled to the output of the geared architecture 48 that drives the fan section 22. In this disclosed example, the ring gear 146 provides the output to the fan section 22. The intermediate pressure turbine 40 also drives the turbine generator 96. The turbine generator 96 is electrically coupled to power the turbine motor 94. The turbine motor 94 may also be powered by battery systems of the aircraft. The turbine motor 94 reduces loads on the intermediate pressure turbine 40 and the low pressure turbine 46 and thereby the amount of fuel required to power rotation of the fan section 22.

Referring to FIG. 5 with continued reference to FIG. 2, the disclosed compressor section 24 includes the first compressor section 50 and a second compressor section 52 that operate independent of each other to provide compressed airflow to the combustor 56. The first compressor section 50 is coupled to the high pressure turbine 54 by shaft 30. The second compressor section 52 is coupled to a compressor electric motor 74 by a shaft 32. Accordingly, the first compressor section 50 and the second compressor section 52 may operate and rotate independent of each other. The high pressure turbine 54 drives a compressor generator 76 that is coupled to the shaft 30. The compressor generator 76 creates electric power that is utilized to drive the compressor motor 74.

The example compressor section 24 supplies compressed airflow from both the first compressor section 50 and the second compressor section 52 to the combustor 56 through a diffuser 84 that crosses over an inlet scroll 78. In the combustor 56, the compressed airflow is mixed with fuel and ignited to produce the high energy exhaust gas flow 98.

In this example, the first compressor section 50 and the second compressor section 52 are identically configured such that they provide an airflow at a common pressure and volume to the combustor section 56. The compressor electric motor 74 drives the second compressor section 52 to match operation of the first compressor section 50 that is driven by the high pressure turbine 54. Accordingly, the second compressor section 52 does not induce a load on the high pressure turbine section 54, but provides a portion of the compressed air utilized in the combustor 56 to generate the high energy gas flow 98.

Referring to FIGS. 5 and 6, with continued reference to FIG. 2, the inlet scroll 78, (FIG. 6) includes an inlet 58 that is disposed axially between the first compressor section 50 and the second compressor section 52. The inlet scroll 78 is configured to provide equal amounts of inlet airflow 82 flow to each of the first compressor section 50 and the second compressor section 52. The example inlet scroll 78 includes a single common inlet 75 that communicates airflow into an annular portion 77 disposed about the axis A. The annular portion 77 is open on both axial sides to communicate airflow to each of the compressor sections 50, 52. Inlets 86 and 88 for the first compressor section 50 and the second compressor section 52 are identically configured to provide an equal airflow to each compressor section 50, 52. The example inlets 86, 88 may include a vane configuration to reduce circumferential velocity components of the airflow to direct airflow axially. It should be appreciated that although a single inlet 75 is illustrated by way of example, additional inlets 75 could be utilized to aid in distributing flow between the two compressor sections 50, 52.

In this disclosed example, the inlet scroll 78 is disposed axially between the first compressor section 50 and the second compressor section 52. The compressor generator 76 is also disposed substantially between the first compressor section 50 and the second compressor section 52. The compressor generator 76 may be arranged in other regions within the compressor section 24 within the scope and contemplation of this disclosure.

Referring to FIG. 7, with continued reference to FIGS. 2 and 5, an example diffuser section 84 is shown that communicates airflow from the compressor sections 50, 52 to the combustor 56. The example diffuser section 84 includes first conduits 62 with first outlets 90 that communicate airflow from the first compressor section 50 to the combustor 56. The diffuser 84 includes second conduits 68 with second outlets 92 that communicate airflow from the second compressor section 52 to the combustor 56. The first and second conduits 66, 68 extend forward around the inlet 75 of the inlet scroll 78. The first outlets 90 and the second outlets 92 are spaced circumferentially about the combustor 56. In this disclosed example, the first outlets 90 alternate circumferentially with the second outlets 92 about the combustor 56 to provide a uniform distribution of airflow from respective compressor sections 50, 52. In one disclosed embodiment, the number of first conduits 66 and second conduits 68 are the same.

The axial orientation of the first compressor 50 and the second compressor section 52 relative to the combustor 56 results in the second compressor section 52 being spaced axially further from the combustor 56 than the first compressor 50. Accordingly, the second conduits 68 are axially longer than the first conduits 66. The difference in axial length between the first conduits 66 and the second conduits 68 may result in differences in airflow characteristics at respective outlets 90, 92. Accordingly, in another disclosed embodiment, the number and flow areas of the first conduits 66 and the second conduits 68 may be different to accommodate differences in airflow characteristics caused by the different axial distance. Moreover, although the disclosed outlets 90, 92 are disclosed as being substantially round, other shapes could be utilized and are within the contemplation of this disclosure.

In one disclosed embodiment, a first airflow 66 through a first outlet 64 from the first compressor section 50 is substantially equal to a second airflow 72 through a second outlet 70 from the second compressor section 52. Because the second compressor section 52 is powered by the compressor electric motor 74, the second compressor section 52 does not induce a load on the high pressure turbine 54. Reducing a load on the high pressure turbine 54 provides structural changes that can improve engine efficiency. The reduced load on the high pressure turbine 54 can improve reaction changes between engine operating conditions. Accordingly, the high pressure turbine 54 may react faster to changes in throttle positions to provide different engine thrust levels.

Additionally, a lower capacity high pressure turbine 54 may be utilized due to the reduction in load requirements. Alternatively, the high pressure turbine 54 may be sized to accommodate loads for operating conditions that occur most often during an engine operating cycle. For example, the high pressure turbine 54 could be sized and configured to operate the first compressor section 50 to accommodate cruise thrust conditions. The second compressor section 52 could be operated at a reduced capacity, or not at all in the cruise conditions and engaged during increased thrust demand conditions, such as during takeoff conditions.

Alternatively, according to another example embodiment, the compressor electric motor 74 may drive the second compressor section 52 at a speed different than that of the first compressor section 50. The different speed may be faster or slower than the first compressor section 50 to provide a variable amount of compressed airflow to the combustor 56 to accommodate different engine thrust levels.

Figure 8:
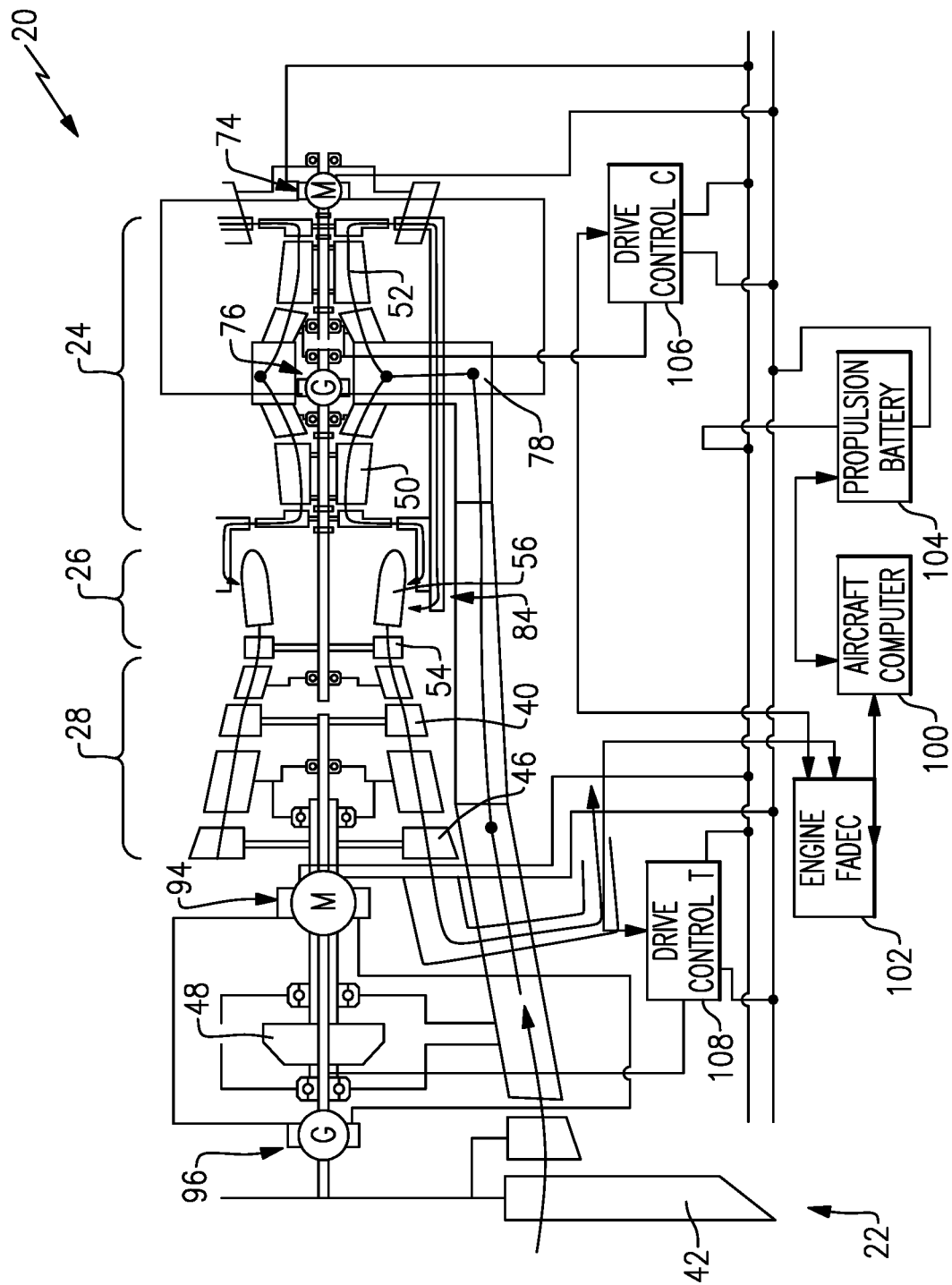
FIG. 8 is a schematic view showing an electrical communication system controlling operation of a gas turbine engine.

Referring to FIG. 8, with continued reference to FIG. 2, the example gas turbine engine 20 is shown schematically to show the electrical system that couples each of the generators 76, 96 to the corresponding motors 74, 94. In this disclosed embodiment, the turbine generator 96 is electrically coupled to the turbine motor 94 through a drive control T 108. The drive control T 108 is in communication with the engine FADEC 102 and also an aircraft computer 100. In this example, the turbine generator 96 is electrically coupled to the turbine motor 94 to provide matched operation. Electric power to operate the turbine motor 94 may be supplemented by a propulsion battery 104. In this example, the turbine generator 96 is driven by the intermediate turbine 40 through a shaft 34. However, the turbine generator 96 may be driven by other turbine sections or combinations of turbine sections. Power input by the turbine motor 94 reduces the power load on the intermediate pressure turbine 40 and low pressure turbine 46. The turbine control T 108 matches and adjusts speeds of the low pressure turbine 46, intermediate pressure turbine 40 and the turbine motor 94 to drive the fan section 22 at a predefined speed.

In one disclosed example embodiment, the compressor generator 76 and compressor motor 74 are coupled electrically to provide substantially matched operation of the first compressor section 50 and the second compressor section 52. A drive control C 106 controls operation of the compressor generator 76 and the compressor motor 74 to match operation to accommodate engine operation. The drive control C 106 may draw electric power from the propulsion battery 104 to power the compressor electric motor 74. The electric power from the battery 104 may supplement electric power provided by the generator 76. The battery 104 may also provide all the power to the compressor motor 74.

Figure 9:
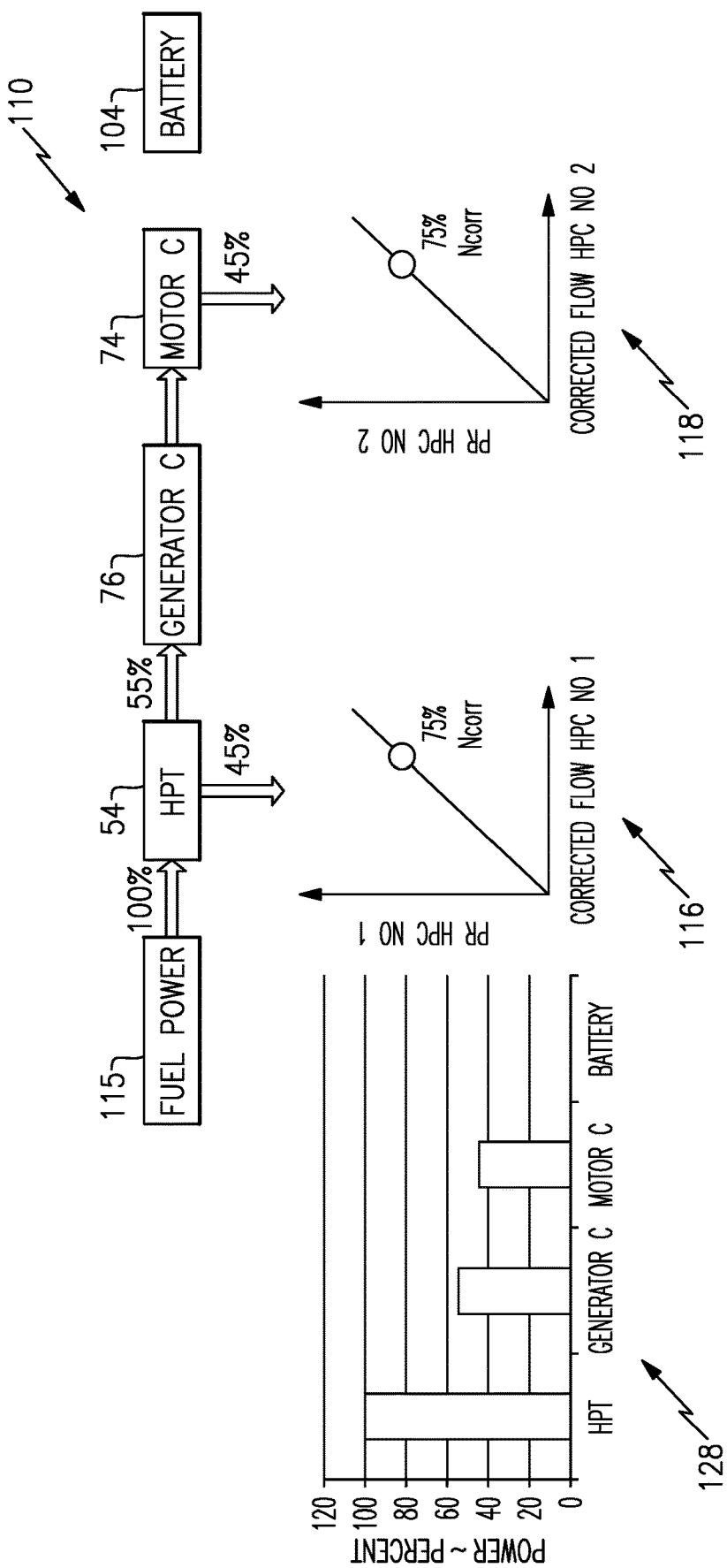
FIG. 9 is a schematic illustration of a power flow of the example compressor section.

Referring to FIG. 9, a diagram is schematically shown and indicated at 110 to illustrate an example mode for controlling power flow of the disclosed compressor section 24. In this example, power generated by the burning of fuel illustrated as fuel power 115 is utilized to drive the high pressure turbine 54. As discussed above, fuel mixed with compressed air is ignited to generate the high energy exhaust gas flow that expands through the high pressure turbine 54. The high pressure turbine 54 converts the gas flow to mechanical power used to drive the first compressor section 50. In the illustrated example, the mechanical power generated from the fuel is split between driving the first compressor section 50 and driving the compressor generator 76. The power to the compressor generator 76 is in turn used to power the compressor motor 74 and ultimately the second compressor section 52. Power from the high pressure turbine 54 directly drives the first compressor section 50. The remaining power, less losses due to the conversion to electric power, is used to drive the compressor electric motor 74. The chart 128 illustrates how the input power to the high pressure turbine 54 flows to the compressor electric motor 74.

In this example, the battery 104 is not utilized to drive the compressor motor 76. As is shown in graphs 116, 118, the compressor sections 50, 52 are operated with a flow that is derived from the power input from the high pressure turbine 54.

Figure 10:
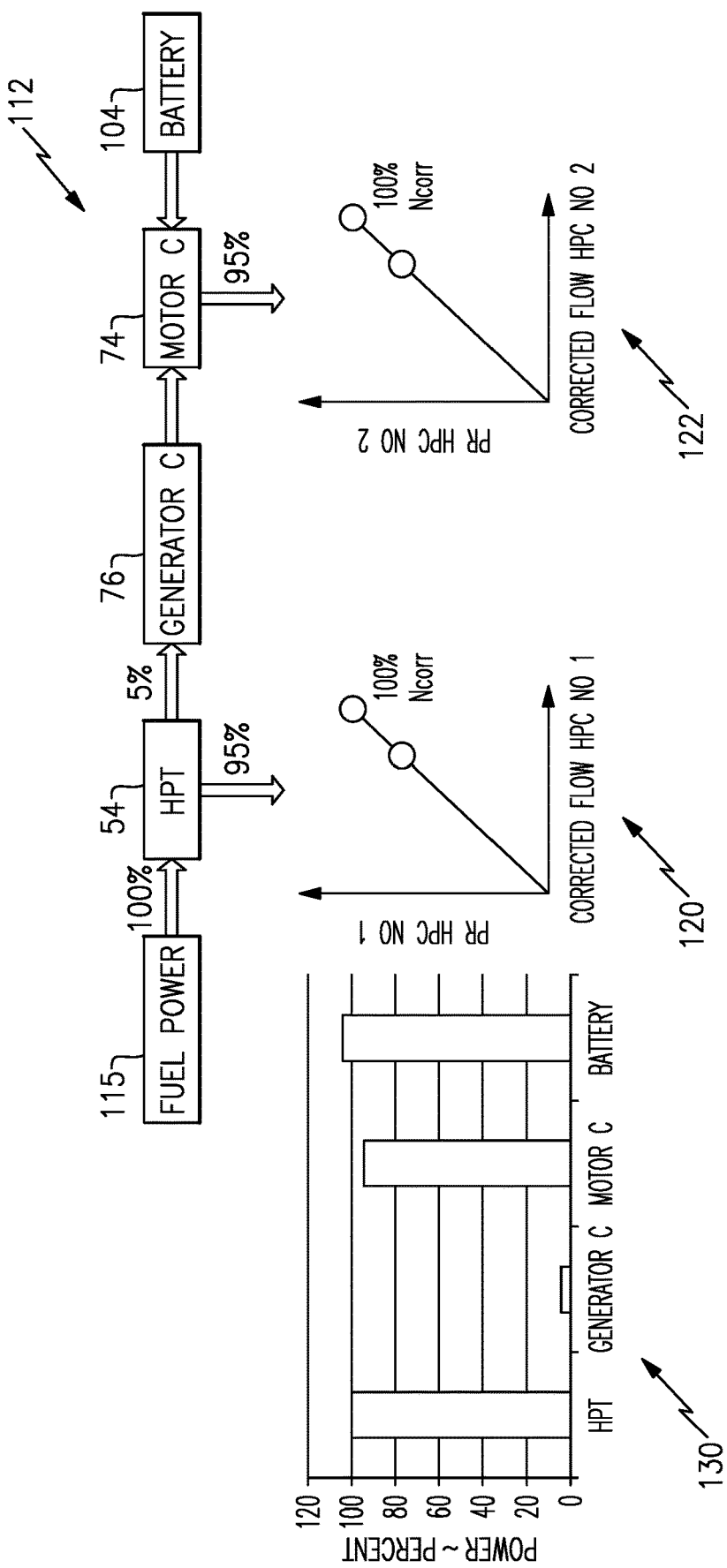
FIG. 10 is another schematic illustration of power flow during another operating condition of the high pressure compressor section.

Referring to FIG. 10, another diagram is schematically shown and indicated at 112 to illustrate another mode of power flow to the disclosed compressor sections 50, 52 when the battery 104 is utilized to supplement power to the compressor electric motor 74. In this example, power input from the battery 104 reduces the demand for power from the high pressure turbine 54 induced by the compressor generator 76. Accordingly, a greater percentage of power from the high pressure turbine 54 can be used to drive the first compressor section 50 as is shown by graph 120. Battery power is provided to the compressor electric motor 74 such that a reduced load is placed on the compressor generator 76 and thereby the high pressure turbine 54. The reduced load on the high pressure turbine 54 in combination with the supplemental power input from the battery 104 provides an overall net increase in compressor operation for both the first compressor section 50 indicated by graph 120 and the second compressor section 52 indicated by graph 122. The chart 130 indicates the power distribution across for this example mode of operation.

Figure 11:
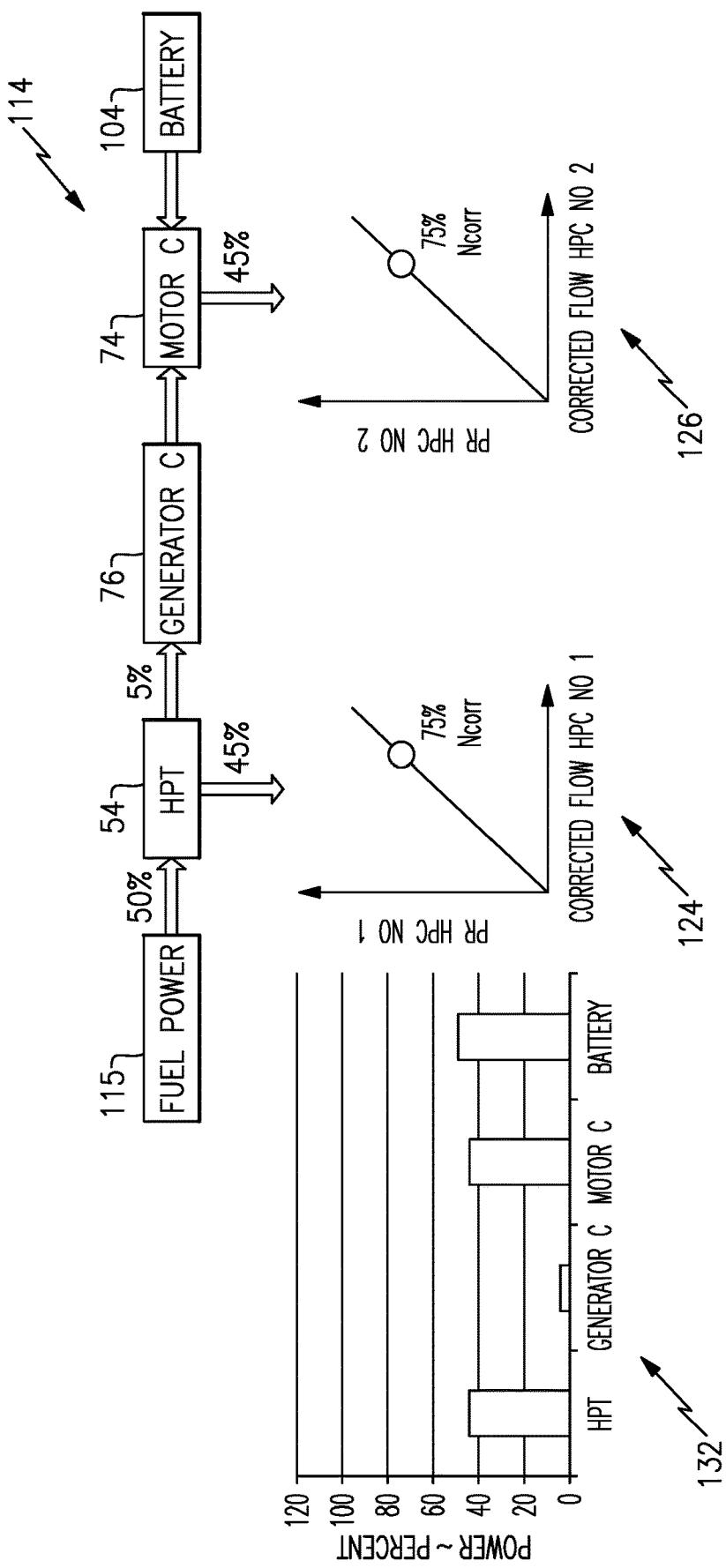
FIG. 11 is another power flow diagram illustrating operation of the example compressor section.

Referring to FIG. 11, another diagram is schematically shown and indicated at 114 that illustrates another example mode of operation where a reduced amount of fuel power 115 is utilized such that the power generated by the high pressure turbine 54 is substantially reduced. Such a reduction of power derived from fuel provides significant fuel savings. Power to drive the second compressor section 52 is supplemented with power from the battery 104 to provide operation at levels substantially the same as those shown in FIG. 9 utilizing a higher level of power from fuel.

Accordingly, supplementing operation of the compressor sections 50, 52 by operating the second compressor section 52 with power from a battery 104 can provide significant fuel savings. As is shown by graphs 124 and 126 as compared to graphs 116 and 118 in FIG. 9, substantial equal operation of the compressor sections 50, 52 is provided with half as much power derived from fuel. As is further shown in chart 132, a reduction in power for each of the high pressure turbine 54 and compressor electric generator 76 is provided by drawing power from the battery 104 to supplement compressor operation.

Accordingly, operating a portion of the high pressure compressor section 24 by way of an electric motor 74 reduces loads on the high pressure turbine to provide different operating modes and significant reductions in fuel. Additionally, the example gas turbine engine 20 provides a compressor section 24 that is split such that it may supply the gas generator airflow for significantly greater engine efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising:
a fan rotatable about an engine longitudinal axis;
a turbine section:
a combustor in flow communication with a compressor section;
a compressor generator coupled to be driven by the turbine section; wherein the compressor section includes a first compressor section and a second compressor section, the first compressor section driven by the turbine section and the second compressor section driven by a compressor motor electrically coupled to the compressor generator; and
a diffuser configured to communicate airflow from the first compressor section and the second compressor section separately to a combustor.

2. The turbine engine as recited in claim 1, wherein the diffuser comprises a plurality of first conduits that extend from the first compressor section to the combustor and a plurality of second conduits that extend from the second compressor section to the combustor, wherein the plurality of first conduits and the plurality of second conduits alternate circumferentially about the combustor section.

3. The turbine engine as recited in claim 2, including a compressor drive control that matches operation of the compressor generator to output requirements of the compressor motor to match operation of the second compressor section with operation of the first compressor section.

4. The turbine engine as recited in claim 1, wherein the first compressor section and the second compressor section generate a total output airflow communicated to the combustor section, wherein the total output airflow comprises a first output airflow from the first compressor section and a second output airflow from the second compressor section and the first output airflow and the second output airflow are equal at the combustor.

5. The turbine engine as recited in claim 1, wherein the first compressor section and the second compressor section generate a total output airflow communicated to the combustor section, wherein the total output airflow comprises a first output airflow from the first compressor section and a second output airflow from the second compressor section wherein the first output airflow is different than the second output airflow at the combustor.

6. The turbine engine as recited in claim 1, including a low pressure compressor forward of the turbine section.

7. The turbine engine as recited in claim 6, including an intake scroll defining a passage for airflow exiting the low pressure compressor to the compressor section and around the turbine section.

8. A turbine engine comprising:
a fan rotatable about an engine longitudinal axis;
a turbine section including an intermediate turbine section and a low pressure turbine;
a turbine generator coupled to be driven by the turbine section;
a turbine electric motor electrically coupled to the turbine generator;
a geared architecture, wherein the turbine section and the turbine electric motor are coupled to drive portions of the geared architecture, wherein the intermediate turbine is coupled to drive the turbine generator and a first portion of the geared architecture and the low pressure turbine coupled to the turbine electric motor and a second portion of the geared architecture;
a compressor section including a portion driven by the turbine section; and
a combustor in flow communication with the compressor section, the combustor configured to generate a high energy flow to drive the turbine section.

9. The turbine engine as recited in claim 8, wherein the fan is an open fan rotor disposed outside of any enclosure.

10. The turbine engine as recited in claim 8, wherein the turbine electric machine is concentric about the engine longitudinal axis.

11. The turbine engine as recited in claim 8, wherein the geared architecture includes a sun gear intermeshed with intermediate gears supported in a carrier and ring gear circumscribing the intermediate gears, wherein the low pressure turbine is coupled to the sun gear and the intermediate turbine is coupled to the ring gear.

12. The turbine engine as recited in claim 11, wherein a shaft coupling the intermediate pressure turbine to the turbine generator extends through a central opening in the sun gear.

13. The turbine engine as recited in claim 8, including a turbine drive control that matches operation of the turbine generator to output requirements of the turbine electric motor.

14. A turbine engine comprising:
- a fan section containing a fan rotatable about an engine longitudinal axis;
- a fan drive system configured to drive the fan, the fan drive system including a turbine section, a turbine generator electrically coupled to a turbine motor and a geared architecture, wherein the turbine section and the turbine motor are coupled to drive portions of the geared architecture;
- a high pressure turbine coupled to drive a compressor generator;
- a high pressure compressor section including a first compressor section and a second compressor section, the first compressor section driven by the high pressure turbine and the second compressor section driven by a compressor motor electrically coupled to the compressor generator; and
- a combustor in flow communication with high pressure compressor, wherein the high pressure compressor section is disposed aft of the combustor and the turbine section is disposed forward of the combustor.

15. The turbine engine as recited in claim 14, wherein the first compressor section and the second compressor section generate a total output airflow communicated to the combustor section, wherein the total output airflow comprises a first output airflow from the first compressor section and a second output airflow from the second compressor section and the first output airflow and the second output airflow and a compressor drive control matches operation of the compressor generator to output requirements of the compressor motor to match operation of the second compressor section with operation of the first compressor section.

16. The turbine engine as recited in claim 15, including a low pressure compressor forward of the turbine section.

\* \* \* \* \*